US009714168B1

(12) United States Patent
White

(10) Patent No.: US 9,714,168 B1
(45) Date of Patent: Jul. 25, 2017

(54) CATALYST FOR CONVERSION AND EQUILIBRATION OF PARA AND ORTHO HYDROGEN

(75) Inventor: James Ferguson White, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 07/409,518

(22) Filed: Aug. 28, 1989

(51) Int. Cl.
| | |
|---|---|
| C01B 3/02 | (2006.01) |
| B01J 21/00 | (2006.01) |
| B01J 23/40 | (2006.01) |
| B01J 23/42 | (2006.01) |
| B01J 23/56 | (2006.01) |
| C01B 3/00 | (2006.01) |
| B01J 37/04 | (2006.01) |
| B01J 37/08 | (2006.01) |
| B01J 37/06 | (2006.01) |
| B01J 21/04 | (2006.01) |
| B01J 37/03 | (2006.01) |
| B01J 23/46 | (2006.01) |
| B01J 37/02 | (2006.01) |

(52) U.S. Cl.
CPC .............. *C01B 3/0089* (2013.01); *B01J 21/04* (2013.01); *B01J 23/46* (2013.01); *B01J 37/0236* (2013.01); *B01J 37/031* (2013.01); *B01J 37/04* (2013.01); *B01J 37/06* (2013.01); *B01J 37/08* (2013.01)

(58) Field of Classification Search
USPC ......... 502/243, 261, 326, 327, 332; 423/649
See application file for complete search history.

(56) References Cited

U.S. PATENT DOCUMENTS

| | | | | |
|---|---|---|---|---|
| 2,943,917 | A | 7/1960 | Weitzel et al. | ................. 23/210 |
| 2,984,630 | A * | 5/1961 | Braithwaite | ............ B01J 21/04 |
| | | | | 423/628 |
| 3,132,000 | A | 5/1964 | Dwyer et al. | ................... 23/200 |
| 3,383,176 | A * | 5/1968 | Keith | ................... C01B 3/0089 |
| | | | | 423/649 |
| 3,472,787 | A | 10/1969 | Kucirka | ........................ 252/432 |
| 3,513,109 | A * | 5/1970 | Stiles | ...................... B01J 23/34 |
| | | | | 423/213.2 |
| 3,554,929 | A * | 1/1971 | Aaron | ...................... B01J 21/16 |
| | | | | 423/213.5 |
| 3,641,182 | A * | 2/1972 | Box, Jr. et al. | ........ B01J 21/005 |
| | | | | 502/332 |

(Continued)

FOREIGN PATENT DOCUMENTS

DE 2012053 9/1970

OTHER PUBLICATIONS

Investigation of the Para-Ortho Conversion of Hydrogen; Engelhard Industries; Tech. Rpt. A7APL-TR-65-59; Jul. 1965 CA81(20) : 1273295 (1974).

*Primary Examiner* — Cam N. Nguyen
(74) *Attorney, Agent, or Firm* — Geoffrey L. Chase; Eric J. Schaal; Amy Carr-Trexler

(57) ABSTRACT

A method for making a high activity ortho-para hydrogen conversion catalyst is set forth wherein a solution of ruthenium cation is mixed with a solution of a poorly coordinating anion such as aluminate to form a precipitate and the precipitate-containing solution is adjusted to a pH of 7 before recovering the catalyst. A product of this process and a method of using such product is disclosed.

19 Claims, 7 Drawing Sheets

(56) References Cited

U.S. PATENT DOCUMENTS

| | | | | |
|---|---|---|---|---|
| 3,794,599 A | * | 2/1974 | Dautzenberg et al. | B01J 23/56 502/325 |
| 4,205,056 A | | 5/1980 | Inokuchi et al. | 423/649 |
| 4,478,955 A | * | 10/1984 | Pesa | B01J 23/8946 502/200 |
| 4,510,320 A | * | 4/1985 | Pesa | C07C 67/36 502/178 |
| 4,619,910 A | * | 10/1986 | Dyer | B01J 23/462 502/325 |
| 4,795,733 A | * | 1/1989 | De Thomas | B01J 23/6567 502/326 |
| 4,910,180 A | * | 3/1990 | Berndt | B01D 53/945 423/213.5 |

* cited by examiner

CATALYST FOR CONVERSION AND EQUILIBRATION OF PARA AND ORTHO HYDROGEN

This invention was made with Government support under Contract No. F33615-87-C2740 awarded by the Department of the Air Force. The Government has certain rights in this invention.

TECHNICAL FIELD

The present invention is directed to the preparation and utilization of an improved ruthenium catalyst for the conversion of para to ortho hydrogen. More specifically the present invention is directed to a pH neutralizing step for the production of highly active ruthenium aluminate and ruthenium silicate catalysts for para to ortho hydrogen conversions.

BACKGROUND OF THE PRIOR ART

The existence of two forms of molecular hydrogen, designated as ortho and para hydrogen is well known. In the hydrogen molecule, the nuclear spins of the two hydrogen atoms can be either in the same direction (ortho) or in opposite directions (para). The proportion of each form of hydrogen present in any given sample of hydrogen at equilibrium is a function of temperature. At temperatures above about −37° C., "normal" hydrogen exists, that is hydrogen having an equilibrium composition of 75% ortho hydrogen and 25% para hydrogen. As the temperature is lowered, the equilibrium composition shifts in the direction of higher para content, i.e. the concentration of para hydrogen increases with decreasing temperature. As the temperature decreases from −73° C. to about −173° C., the para hydrogen concentration increases gradually from 25% to about 38%; at −195° C., the composition is about 50% ortho-50% para; while at the boiling point of hydrogen at atmospheric pressure, hydrogen exists as substantially 100% para.

Ortho and para hydrogen, while chemically identical, exhibit different physical properties, e.g., each of these forms of hydrogen have different heat capacities and thermal conductivities. Further, the transformation of ortho to para hydrogen to approach the equilibrium proportions of each as the temperature of a hydrogen sample is decreased is exothermic, i.e. accompanied by a liberation of heat. Conversely, the conversion of the para to the ortho form is endothermic.

The liberation or absorption of heat which is characteristic of the interconversion of these forms of hydrogen can be an advantage or disadvantage, depending upon the particular use or process involved in the use of hydrogen. For example, liquefied normal hydrogen undergoes autogenous conversion of ortho to para hydrogen, liberating 339 calories per mole upon conversion of normal hydrogen to 100% para hydrogen at about −252° C. Since the heat of ortho hydrogen conversion is greater than the heat of vaporization of hydrogen at atmospheric pressure, liquid hydrogen will vaporize until 100% para hydrogen composition is reached. Thus, before storage of liquid hydrogen, conversion of normal hydrogen to the low temperature equilibrium composition of hydrogen (high para) is beneficial, and indeed necessary in hydrogen liquefaction processes.

Similarly, in certain applications, absorption of heat which occurs in the conversion of para to ortho hydrogen can be utilized to provide low temperature refrigeration. However, the rate of autogenous transformation of one form of hydrogen to the other is extremely slow, even at room temperature, but it has been found that conversion can be accelerated in either direction by catalysis. This invention is concerned with catalysts which are effective for promoting para to ortho hydrogen conversion.

Heat management on board hypersonic aircraft such as the National Aero-Space Plane (NASP) and other high speed (up to mach 20) hydrogen fueled vehicles will be a significant problem. All of the large air frame and other cooling requirements on such craft will be supplied by the latent and sensible refrigeration of the very cold (−422° F.) liquid hydrogen fuel. However, the cooling requirement is so vast for the NASP that if enough liquid hydrogen to provide all the cooling needs is carried on board at take off, the pay load capacity of the craft would be uneconomically small.

If catalytic endothermic conversion of para into ortho hydrogen is performed on board the NASP as the hydrogen fuel is warmed before use, up to 39% additional cooling capacity is potentially available from a given amount of liquid hydrogen. This means that combining the natural cooling available from the latent and sensible refrigeration of liquid hydrogen with catalytic endothermic para into ortho conversion can substantially reduce the weight of liquid hydrogen needed at take off. Reduced hydrogen fuel weight at take off is necessary to make the pay load weight large enough for the NASP to be economical.

For this approach to be practical, the total weight of the catalyst needed to cause para to ortho conversion and the heat exchange equipment associated with it must be small. One way to state the situation is that each pound of catalyst and equipment must save more than a pound of hydrogen fuel weight. The catalyst must be very active on both the weight and volume basis if its weight, combined with the weight of its associated equipment, is to be small. Calculations show that the best existing commercial catalyst is not active enough for application to para to ortho conversion on board the NASP. A catalyst with an activity about four to five times greater than the best known commercial nickel/silica catalyst is required.

It should be noted at this point that activity of para to ortho hydrogen catalysts is often expressed in terms of "beta". Beta is defined as the number of pounds of catalyst which are required to convert a pound of para hydrogen to ortho hydrogen in one second. As such, it is essentially the inverse of activity expressed in the normal fashion. High activity is thus associated with a low beta. The state of the art commercial catalyst based on nickel has a beta value of about 20 to 22 at 70% of equilibrium conversion. A catalyst with a beta of 5 or less is desired for the WASP heat management application. A higher activity catalyst may also find benefit for use in hydrogen liquefaction by reducing the size and capital costs of the ortho to para convertors which are necessary parts of any hydrogen liquefaction process.

Englehard Corporation reported the discovery of a catalyst which has high activity, in their Air Force sponsored research work in the 1960s. This is the sole report of a catalyst which appears to have higher activity than the nickel/silica commercial catalyst. This catalyst was based on ruthenium impregnated on a variety of supports (in particular, silica-alumina) and was claimed to have a beta of 4.5 at 70% of equilibrium conversion compared to the commercial nickel/silica catalyst, whose beta is about 20. This result was reported in their contract research report, *INVESTIGATION OF PARA-ORTHO CONVERSION OF HYDROGEN, TECHNICAL REPORT AFAPL-TR*-65-59, JULY 1965. The catalyst physical and chemical characteristics and the complete details of how it was prepared and activated were not revealed. It was described simply as containing 30% of ruthenium on a preformed silica-alumina support. It was prepared by impregnation and the surface area was about 260 m$^2$/g.

Only one beta value at this low 4.5 level was reported by Englehard. The Englehard report was published at about the same time as a patent to Englehard on the same subject matter, U.S. Pat. No. 3,383,176. The report and the patent show many catalyst examples with betas in the range of about 12 to 30. The patent does not show the 4.5 beta result that was shown in the report. The inventor of the present invention has tried to reproduce the 4.5 beta result reported by Englehard without success. The best beta activity level achievable by the inventor of the present invention using the Englehard technique was approximately 12. This attempt was done using the catalyst impregnation techniques and supports which should, according to the teachings of the Englehard patent, reproduce high activity, low beta results, which were reported in the Englehard report.

U.S. Pat. No. 2,943,917 describes a process for catalytically converting hydrogen in the ortho-para states using a catalyst of ferric oxide gel particles. The ferric oxide gel is produced by precipitation from an aqueous solution of a soluble ferric salt with a soluble hydroxide. The resultant precipitate forms a gelatinous solid. The precipitate must be washed with water until most of the anion or the original ferric salt has been removed. However, washing the precipitate until approximately 0.1% of the original solution remains has been found sufficient. After the precipitate has been washed, it is filtered and dried.

U.S. Pat. No. 3,132,000 is directed to a process for the preparation of hydrous ferric oxide for use as ortho-para hydrogen catalysis. The ferric oxide catalyst is made by preparing aqueous solutions of sodium hydroxide and ferric chloride. The solutions are mixed at elevated temperature of 85 to 95° C. and then cooled to below 35° C. to precipitate ferric oxide. In the preferred embodiment of the patent, the pH of the aqueous mixture after mixing is adjusted so as to be in the range of about 0-10.

U.S. Pat. No. 3,472,787 is directed to catalysts, such as for ortho-para hydrogen conversions, which involves the addition of a solution containing ions of chromium, manganese, iron, cobalt, nickel and mixtures thereof with anions of silicate, borate, aluminate and mixtures thereof in a precooled condition and further treating the resulting slurry at temperatures above 60° C. for a time sufficient to lower the pH of the slurry to a substantially constant level indicative of completion of the reaction, with subsequent recovery of the catalyst using traditional techniques. For the preferred catalysts of nickel silicate, the pH will drop from a slightly alkaline or neutral point to a level of about 5 or 6.

U.S. Pat. No. 4,205,056 describes a process for ortho-para hydrogen conversion using a sulfur-containing semiconductive polymer produced by the dehalogenation of poly(tetrahalophenylene sulfide) in the presence or absence of an organic solvent at 150-500° C.

Hitachi, as reported in Chemical Abstracts 127329S obtained a patent Kokai 7441, 290 directed to nickel oxide and silicon oxide catalyst for ortho-para hydrogen conversions wherein the precipitate from solution is adjusted in the range of 7-9 to form a gel which is further treated for catalyst recovery.

German Patent 2,012,053 is directed to the conversion of ortho and para hydrogen.

In order to affect economical conversion of hydrogen from ortho to para state for long term storage of liquefied hydrogen fuels, it is important to have a high activity catalyst for such. More stringently, in order to have adequate pay loads on a NASP vehicle flying at supersonic speeds which create high levels of heat due to the friction of air on external surfaces, it will be necessary to have a high activity catalyst to take advantage of the endothermic effect of converting para to ortho hydrogen fuel aboard such a vehicle prior to utilization of the fuel for propulsion. The catalysts of the prior art do not demonstrate sufficient activity to warrant their implementation in the stringent requirements of a WASP vehicle. However, the limitations on activity of the catalysts of the prior art are overcome by the present invention which provides high activity catalysts which are demonstrated to be readily reproducible, as set forth below.

SUMMARY OF THE INVENTION

The present invention is a method of preparing a catalyst of improved activity comprising the steps of mixing a solution of ruthenium cation with a solution of an anion comprising a ligand of poor coordinating power, precipitating a catalyst from solution comprising a ruthenium salt of the ligand, adjusting the pH of the precipitated catalyst containing solution to an approximately neutral pH and recovering a precipitated ruthenium catalyst.

Preferably the ligand is selected from the group consisting of aluminate, silicate, borate, molybdate and hexafluorophosphate. Optimally, the ligand is aluminate.

Preferably the pH is adjusted in the range of 6.2 to 7.8. Optimally, the pH is adjusted in the range of 6.8 to 7.2.

Preferably the recovery process includes filtering, washing and drying of the precipitated ruthenium catalyst.

More specifically the present invention is a method of preparing a ruthenium aluminate catalyst for conversion and equilibration of para and ortho hydrogen of improved activity comprising the steps of mixing a solution of ruthenium cation with a solution of aluminate anion, precipitating a ruthenium aluminate catalyst from solution, adjusting the pH of the solution containing the precipitate catalyst to a pH in the range of 6.8 to 7.2 and recovering the ruthenium aluminate by filtered the precipitate from the solution, washing the filter precipitate and drying the washed precipitate.

Preferably the solution of ruthenium cation comprises aqueous ruthenium chloride. Alternately, the solution of ruthenium cation comprises aqueous ruthenium nitrate. Preferably the solution of aluminate anion comprises aqueous sodium aluminate.

The present invention also more specifically is directed to a method of preparing a ruthenium silicate catalyst for conversion and equilibration of para and ortho hydrogen of improved activity comprising the steps of mixing a solution of ruthenium cation with a solution of silicate anion, precipitating a ruthenium silicate catalyst from solution, adjusting the pH of the solution containing the precipitated catalyst to a pH in the range of 6.2 to 7.2 and recovering the ruthenium silicate by filtering the precipitate from the solution, washing the filtered precipitate and drying the washed precipitate.

Similarly, the ruthenium cation solution can be ruthenium chloride or ruthenium nitrate and the solution of silicate anion can comprise aqueous sodium silicate.

The present invention is also directed to a ruthenium catalyst prepared by the process of mixing a solution of ruthenium cation with a solution of an anion comprising a ligand of poor coordinating power, precipitating a catalyst from solution comprising a ruthenium salt of the ligand, adjusting the pH of the precipitated catalyst containing solution to an approximately neutral pH and recovering the precipitated ruthenium catalyst.

Preferably the ruthenium catalyst made by the process identified above is ruthenium aluminate. Alternatively, the ruthenium catalyst made by the process above is ruthenium silicate.

The present invention is also directed to a method for the conversion of hydrogen feed, containing an ortho-para hydrogen distribution which differs from the equilibrium ortho-para hydrogen distribution at any particular temperature, to hydrogen having an ortho-para content more closely approaching the equilibrium distribution thereof comprising contacting said hydrogen feed with a catalytic amount of a ruthenium salt of the ligand prepared by the method of mixing a solution of a ruthenium cation with a solution of an anion comprising a ligand of poor coordinating power, precipitating a catalyst from solution comprising a ruthenium ligand, adjusting the pH of the precipitate catalyst containing solution to a neutral pH and recovering the precipitated ruthenium catalyst:

Preferably the catalyst used in the hydrogen equilibration is ruthenium aluminate. Alternatively, the catalyst used in the hydrogen equilibration is ruthenium silicate.

DETAILED DESCRIPTION OF THE INVENTION

Figure 1:
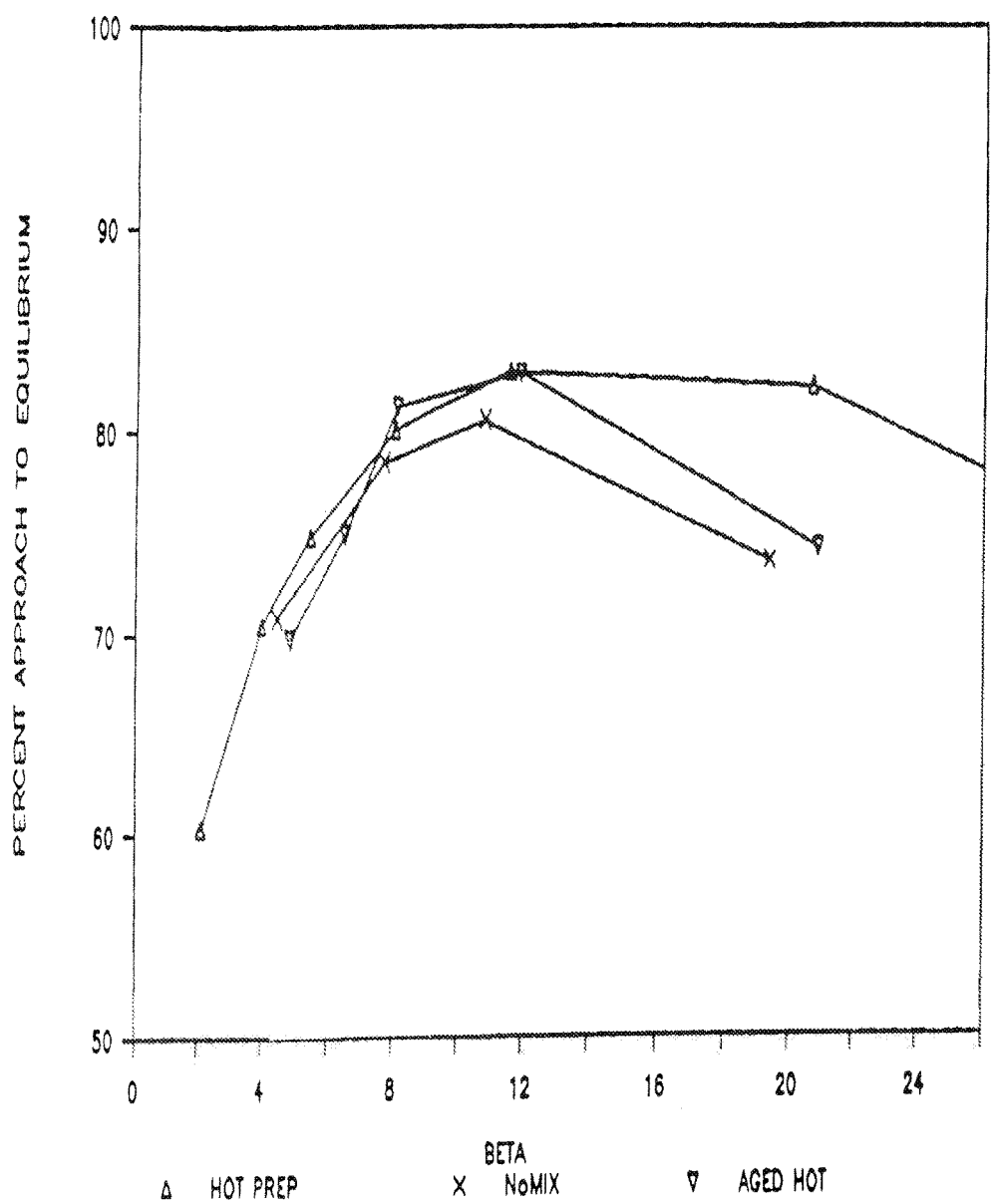
FIG. 1 is a graph showing the reproducibility of the catalyst of the present invention using three different precipitation techniques.

The present invention is a method and a product of that method comprising a ruthenium-based improved and reproducible para-ortho conversion catalyst. The improved catalyst of this method has an activity such that it exhibits an activity beta value at 70% approach to equilibrium of between 3.5 and 6 when tested at 500 psig and 77° K. This high activity has been reproduced several times in several batches in ortho-para conversion activity test runs. This catalyst has activity high enough (beta low enough) to be useful in heat management applications on the NASP and other hypersonic hydrogen fueled aircraft. No other catalyst is known which is both active enough for this application and readily prepared in a reproducible manner, such as with the method of the present invention. An important factor in the present invention's method for producing the ruthenium catalyst is precipitation of ruthenium from solution with anions comprising ligands of poor coordination power. In multiple examples, the present inventor has precipitated ruthenium with aluminate anion ($AlO_2^{-1}$) ligand by combining solutions of soluble ruthenium chloride or nitrate and sodium aluminate. After pH adjustment, filtering and washing, this unique method produced a catalyst with high activity, such that beta values of 3.5 to 6 were observed. Beta values of between 4 and 6 have also been observed on catalysts prepared by precipitating ruthenium from solution with silicate ion.

A poorly coordinating ligand for purposes of the present invention comprises any ligand that exhibits weak interaction with a metal to which it is coordinated or attached. Interaction in this sense is either direct ionic, i.e. +/− charge type interaction or electronic in the sense of covalent bond formation. A weakly coordinating ligand therefore will form weak ionic attractions with a metal if it has a low charge, a low charge density (actual charge divided by size), holds tightly to its electrons and does not allow them to enter into sigma or pi bond formation, or is of such a steric structure (size or shape) that it cannot get close enough to a metal atom to form strong bonds. There can be a combination of these factors within the same ligand. Examples are aluminate ($Al_2^{-1}$), silicate ($SiO_3^{-2}$), borate ($BO_2^-$), phosphomolybdate ($Mo_{12}PO_{40}^{-3}$), etc. There are others, but for practical catalytic use they should form a stable precipitate when contacted with ruthenium ions in solution. Aluminate and silicate, as well as some others, have features in common:

1. They contain strong bonds between the elements of which they are composed, e.g., Al—O and Si—O.
2. They are capable of forming a stable, porous structure by themselves, e.g., alumina or silica.
3. They have relatively low charge density (compared to strong ligands like chloride or cyanide, etc.

Another important consideration in the process of the present invention for achieving high activity in a ruthenium catalyst is adjustment of the pH of the mixed reagent solutions to a pH of approximately 7 after they are combined and mixed. Adjustment to higher or lower pH (7.8 or 6.2) produces a product with lower activity (higher beta). If the individual solutions are made up (i.e. by adding acid or base to one or the other of the individual solutions) such that the pH immediately after they are combined is between 6.2 and 7.8, a lower activity catalyst results. If the pH is adjusted to below about 5.8 or above 8.5, very little or no solid catalyst product results. Variables such as the temperature of the solutions, the intensity of mixing, aging and solution concentrations do not seem to be important and may be within wide ranges.

The catalyst prepared as noted above is characterized by an x-ray fraction pattern without distinctive crystalline peaks, except for some broad low intensity peaks indicative of hydrated alumina (in case of alumina-containing catalysts), and ESCA spectrum which indicates ruthenium in the +3, +4, and/or +6 valence states and a surface area near or above 200 $m^2/g$. ESCA data also indicates the ruthenium is very highly disperse throughout the solid catalyst. It has also been shown (for ruthenium alumina) that the preferred composition is near 25% ruthenium when calculated on a dry or ignited basis or approximately 30% ruthenium oxide, 70% aluminum oxide when calculated as oxides.

Although the exact structure of the catalyst is not known and the inventors do not wish to be held to any particular theories, it is believed that the ruthenium is present in ionic form coordinated to the anion (silicate, aluminate, etc.) which is used to precipitate the ruthenium. The ruthenium may actually be present as a discrete compound such as ruthenium aluminate ($Ru(AlO_2)_3$) or ruthenium metasilicate ($Ru_2(SiO_3)_3$) and the like, although this has not been demonstrated. There may also be present alumina or silica which is not associated with the ruthenium. It may be preferred that such unassociated alumina or silica be present to help develop porosity and surface area which is needed for high catalytic activity. It is believed that high porosity and high surface area of the catalyst and the high dispersion of the ruthenium combine to result in very high activity for the para to ortho hydrogen conversion when utilized in conjunction with the unique synthetic methods for producing the catalyst of the present invention. The mechanism of para to ortho hydrogen conversion using this catalyst is not known, however magnetic susceptibility data suggests that it may be preceeding via a non-dissociative magnetic mechanism.

The catalysts of the present invention are made by the unique methods set forth below as exemplified for aluminate and silicate.

Mode 1—Aluminate

A solution of ruthenium chloride was made by dissolving 10.81 g of commercial ruthenium trichloride hydrate containing 36.62% ruthenium in 150 ml of distilled water. A solution of sodium aluminate was made by diluting 44.7 g of Kaiser SOAL-235 sodium aluminate (containing 23.5% by weight of alumina) with water to a final volume of 150 mls. The solutions were pumped to a jet mixing nozzle at the rate of about 1 liter/min. A thin black precipitate formed in the jet mixing and was directed to an operating Waring blender which had been pre-charged with about 200 mls of distilled water. About 100 mls of additional water was pumped through the jet mixer/pump system as a rinse to get all of the ruthenium and aluminate solutions into the blender. The pH at this point was 10.8. The pH was then adjusted to 7±0.05 with 10% nitric acid solution, causing the precipitate to become a bit thicker.

For those samples pre-reduced with formaldehyde, 150 mls of 37% formalin solution was added at this point and allowed to stir overnight before recovery.

For those not pre-reduced, the precipitate was either filtered on a Buchner funnel and washed 4 to 5 times with 800-1000 mls each time with distilled water or centrifuged and washed 5 to 6 times by decanting and redispersing in 500-800 ml of water and recentrifuging for each wash step.

The sample was then dried in an electrically heated oven in air at 100-110° C.

Alternate to the above recipe using ruthenium chloride, commercial ruthenium nitrate solution may be used. For example, 46.25 g of Englehard ruthenium nitrate solution containing 8.4% of ruthenium was diluted to 150 mls. A companion solution of sodium aluminate was made by diluting 44.68 g of SOAL-235 sodium aluminate with Dist. water to a final volume of 150 mls.

The balance of the preparation followed the same steps as above, except that none of the catalyst samples made with ruthenium nitrate solution were pre-reduced with formaldehyde.

Mode 2—Silicate

A ruthenium solution was made by dissolving 19.51 g of commercial ruthenium trichloride hydrate (36.6% of Ruthenium) in 200 mls. of distilled water. A sodium silicate solution was made by diluting 60.98 g of P.Q.'s "N-Brand" sodium silicate (contains 28.7% by weight of Silica and has a silica to sodium oxide weight ratio of 3.22 and a pH of 11.3) to 200 mls with distilled water.

The two solutions are mixed by pumping through a jet mixer nozzle and into an operating Waring blender containing 300 mls of water. The pH of the thin black precipitate was 3.85. The pH was adjusted to about 6.9 with 5% sodium hydroxide solution, making the precipitate a bit thicker. Then 150 mls of 37% formalin was added to pre-reduce the catalyst while stirring at room temperature overnight. After the formaldehyde treatment, the pH was 4.3. The pH was then re-adjusted to 7 and the thick precipitate was recovered by filtering on a Buchner funnel. It was washed with distilled water 5 times, each time the solid cake on the filter was redispersed in 800-1000 mls of water and re-filtered on the Buchner.

An "oven dried" or "water dried" portion was prepared by drying about ⅓ of the final washed precipitate in an electrically heated air oven at 100-200° C. An "acetone dried" portion was prepared by first washing about ⅓ of the water-wet final washed precipitate with acetone several times and finally removing all the water by extracting the water by Soxlet extraction with acetone overnight. Water was trapped in the acetone reservoir of the extractor with 3 A molecular sieves. When the water had been removed, the acetone-wet precipitate was allowed to dry in dry air for several hours at room temperature and finally overnight in the air oven at 100-200° C.

A "freeze dried" portion was prepared placing the final ⅓ of the water-wet precipitate in a 250 ml single neck ground-glass flask equipped with a tube fitting and stopcock closure. The flask was then evacuated to about 0.01 mm Hg of vacuum and solid frozen. The freezing bath of liquid nitrogen was removed and vacuum continued until the solid was completely dry (about 36 hours).

The apparent bulk density of the freeze dried portion was approximately 0.3 grams/cc, that for the acetone dried portion was 0.6 grams/cc and that for the oven or water dried was 0.9 grams/cc.

Other ruthenium/silicate catalysts were prepared:

From ruthenium nitrate and N-Brand sodium silicate with no formaldehyde pre-reduction . . . not active From $RuCl_3$ and RU-Brand sodium silicate (33.2% Silica, silica/sodium oxide ratio=2.40, pH=12) with and w/o formaldehyde and with and w/o freeze drying . . . none active From $RuCl_3$ and D-Brand sodium silicate (29.4% silica, silica/sodium oxide=2.00, pH=12.7) variations as above . . . none active Several repeats of the main method detailed above using N-Brand . . . two repeats of the freeze dried and formaldehyde pre-reduced version were active, several others were not.

Catalysts were prepared in a manner designed to reproduce the best ruthenium catalysts of the Englehard 1964 report described above. These catalysts were produced by the method of incipient wetness impregnation using a solution of commercial ruthenium chloride in water or acetone or commercial ruthenium nitrate in water. The results of these attempts are set forth in Table 1 below wherein it is demonstrated that low betas in the order of 3.5 to 6 were not achievable.

TABLE 1

| CATALYST NUMBER | CATALYST TYPE | SUPPORT TYPE | % RUTHENIUM | ACTIVATION GAS/TEMP C./HRS | | | BETA @70% EQUIL | COMMENTS |
|---|---|---|---|---|---|---|---|---|
| 9054-23 | IMPREG. | Si/Al | 30 | He | 160 | 2 | >>30 | |
| 9854-48 | " | " | " | " | 150 | 2 | >>20 | pre-reduced w/formic acid |
| 9854-23 | " | " | " | H2 | 250 | 2 | >47 | |
| " | " | " | " | " | 450 | 2 | 48 | |
| " | " | " | " | " | 550 | 2 | 40 | |
| " | " | " | " | " | 600 | 2 | 18 | |
| " | " | " | " | " | 650 | 2 | 12 | |
| " | " | " | " | " | 700 | 2 | 16.5 | |
| 9854-49 | " | Linde LZY-72 Zeolite | " | " | 650 | 2 | 13.5 | |

The above examples were the best results obtained when attempting to reproduce the best 30% Ruthenium impregnated catalyst in Englehard's 1964 report. Others made on different supports by impregnation were much less active.

Catalysts were further obtained by ion exchange synthesis and by catalyst suppliers Johnson-Matthey and Englehard and compared as set forth below. The ion exchange catalyst was prepared by contacting an eta alumina support (surface area approximately 300 m²/gm; 1.0 cc/gm water porosity) in the form of 20-30 mesh granules with an aqueous solution of ruthenium chloride for a period of several hours at room temperature with intermittant stirring. The ruthenium solution was decanted from the alumina granules, and they were then washed several times with distilled water and dried at 110°-120° C. in an electrically heated air oven. It can be seen as set forth in Table 2 that low betas were not achievable with these catalysts.

TABLE 2

The next three catalysts were 1)-prepared by ion exchange, 2)-obtained from Johnson-Matthey, and 3)-obtained from Englehard as their attempt to reproduce the high activity catalyst from their 1964 report.

| CATALYST NUMBER | CATALYST TYPE | SUPPORT TYPE | % RUTHENIUM | ACTIVATION GAS/TEMP C./HRS | | | BETA @70% EQUIL | COMMENTS |
|---|---|---|---|---|---|---|---|---|
| 9854-101-1 | ION EX-CHANGED | ALUMINA | NOT DETER'D | H2 | 300 | 5 | 14 | |
| 9854-101-1 | | | | " | 400 | 2 | 15 | |
| | | | | " | 650 | 2 | 16 | |
| SUPPLIED BY JOHNSON-MATTHEY | IMPREG. | ALUMINA | 10 | " | 300 | 5 | | NOT ACTIVE RECEIVED AS PRE-REDUCED |
| 10301-34 | IMPREG. | SILICA | 15 | He | 150 | 2 | | NOT ACTIVE ENGLEHARD |
| " | | | | H2 | 300 | 2 | | NOT ACTIVE CATALYST |
| " | | | | " | 650 | 2 | | " |

Catalysts of the present invention were prepared as silicates by the technique described above for the process of the present invention (Mode 2) with the result that ruthenium silicate catalysts with the appropriate high activity beta values were achieved, but the results were difficult to reproduce. These results were set forth in Table 3 below.

TABLE 3

This series of catalysts illustrate the precipitated catalysts from silicate by precipitation:

| CATALYST NUMBER | CATALYST TYPE | SUPPORT TYPE | % RUTHENIUM | ACTIVATION GAS/TEMP C./HRS | | | BETA @70% EQUIL | COMMENTS |
|---|---|---|---|---|---|---|---|---|
| 9854-73-1 | PRECIPITATED | SILICATE | 30% RuO | H2 | 650 | 2 | 4 | REDUCED w/HCHO* & FREEZE DRIED |
| 9854-73-2 | PRECIPITATED | " | 30% RuO | " | " | " | >30 | ACETONE DRIED |

TABLE 3-continued

This series of catalysts illustrate the precipitated catalysts from silicate by precipitation:

| CATALYST NUMBER | CATALYST TYPE | SUPPORT TYPE | % RUTHENIUM | ACTIVATION GAS/TEMP C./HRS | | | BETA @70% EQUIL | COMMENTS |
|---|---|---|---|---|---|---|---|---|
| 9854-73-3 | PRECIP-ITATED | " | 30% RuO | " | " | " | 36 | OVEN DRIED |

Catalyst 9854-73-1 was reproduced two times successfully, many other times reproduction was not successful. Activation of 9854-73-1 at 300° C. in $H_2$ for 5 hours was also not successful.
*HCHO = formaldehyde Ruthenium aluminate catalysts of the present invention using the synthesis method described above for the present invention (Mode 1) were produced as set forth in Table 4 with very good reproducibility of high activity, low beta numbers. These results demonstrate that ruthenium aluminate would be a preferred catalyst using the reproducible synthetic method for catalyst preparation of the present invention.

TABLE 4

| CATALYST NUMBER | CATALYST TYPE | SUPPORT TYPE | % RUTHENIUM | ACTIVATION GAS/TEMP C./HRS | | | BETA @70% EQUIL | COMMENTS |
|---|---|---|---|---|---|---|---|---|
| 9854-74-1 | PRECIP-ITATED | ALUMI-NATE | 30% RuO | H2 | 650 | 2 | 4.6 | FROM RuCl3 & HCHO* PRE-RED'N |
| Several different | PRECIP-ITATED | ALUMI-NATE | 30% RuO | " | " | " | 4 to 5 | NO HCHO* PRE-RED'N |
| 9854-24-1 | PRECIP-ITATED | ALUMI-NATE | 30% RuO | " | " | " | ca 4.5** | YES HCHO PRE-RED'N |
| 9854-24-2 | PRECIP-ITATED | ALUMI-NATE | 30% RuO | " | " | " | >30 | PRE-RED'N + FREEZE DRYING |
| 10310-26-1 | PRECIP-ITATED | ALUMI-NATE | 30% RuO | " | " | " | 4 | NO HCHO PRE-RED'N |
| 10310-26-2 | PRECIP-ITATED | ALUMI-NATE | 30% RuO | " | " | " | ca 3.5 | NO HCHO PRE-RED'N, FREEZE DRIED |
| 10310-39, 40 & 50 | PRECIP-ITATED | ALUMI-NATE | 30% RuO | " | " | " | 3.5-4 | NO HCHO RED'N FROM Ru NITRATE |

**Extrapolated Value From Graph
Ru/Alumina precipitated catalyst was reproduced several times using RuCl3 as raw material with beta values of 4 to 6 observed. Formaldehyde pre-reduction was found not necessary and freeze drying may be harmful to catalyst activity for Ru/Alumina but this is not a clear cut observation
Activation at 300° C. is possible. The ruthenium content was found to be optimum near 30% RuO. Several Preparation Variations were found to give similar results.
Commercial Ruthenium Nitrate was found to possibly make a slightly more active catalyst than Ruthenium Chloride. This may be the result of a lower residual chloride content in the catalyst prepared from ruthenium nitrate.
The catalyst is deactivated by exposure to air but most of its activity can be restored by reactivation in hydrogen under the same conditions which were used to initially activate it.
There is an effect on activity related to the pH of preparation of Ruthenium/Alumina precipitated catalysts.
*HCHO = formaldehyde With regard to the specific application of the catalytic requirements of a NASP aerospace plane, the appropriate characteristics of the ruthenium catalysts made by the synthesis methodology of the present invention are best compared on a volume basis rather than a weight basis for beta values and this information is set forth in Table 5 below.

TABLE 5

Beta Weight vs. Volume

| Catalyst | WEIGHT BETA | DENSITY Grams/cc | Lbs/CuFt | VOLUME BETA | CATALYST Type |
|---|---|---|---|---|---|
| 30% RuO/Al2O3 | 4 | 0.7 | 44 | 0.09 | Precip. (present invention) |
| 30% RuO/SiO2 | 4 | 0.3 | 19 | 0.22 | Precip. (present invention) |
| 30% Ru/SiO2—Al2O3 | 12 | 0.77 | 48 | 0.25 | Impreg. (Englehard Reprod'n) |
| Air Products Ni/Silica | 20 | 0.5 | 32 | 0.64 | Precip. (commercial) |

Table 5 compares the normal weight based beta with beta based on volume. The volume beta is obtained by dividing the usual weight beta by the catalyst density. Volume beta is a better measure of overall catalyst performance since it relates to the total size and weight of the catalyst plus the equipment which would be required to use it.
This Table illustrates how oven dried, high density Ru/Alumina precipitated catalyst is clearly better than the low density Freeze dried Ru/Silica catalyst even though weight beta at 70% of equilibrium conversion for each is about the same. The lower volume beta for Ru/Alumina indicates that smaller and therefore lighter equipment is needed to contain it for actual use. The Table also indicates clearly why the commercial Ni/Silica catalyst does not compare with Ru/Alumina since its volume and weight beta are both much larger than for the Ru/Alumina catalyst. Also to be noted is that the best catalyst made by the present inventor in attempts to reproduce Englehards high activity, low beta catalyst of the 1960s is not as good as the Ru/Alumina precipitated catalyst even though it is much better than the recited commercial Nickel/Silica catalyst.

Because of the high level of success in synthesizing ruthenium aluminate catalysts with high activity low betas using the methodology of the present invention, a series of ruthenium aluminate catalysts were prepared and betas were measured based upon a percent approach to equilibrium. At 70% approach to equilibrium or thereabouts, most all of the ruthenium aluminate catalyst made by the process of the present invention as described above (Mode 1) and reported in Table 6 below were effective in reaching the target high activity low beta number range of 3.5 to 6 as set forth below.

Example 10310-26-1 $RuCl_3$, Hot Mix

Soln 1: 14.14 gm of $RuCl_3 \times H_2O$ (36.62% Ru) dissolved in 150 mls dist. water. Soln. 2: 59.57 gms SOAL-235 sodium aluminate solution diluted to 150 mls with water. Both solutions were heated to 80 deg.C and kept hot while they were mixed, washed by 5 centrifuging cycles as described on page 1. One half was oven dried. Note: RuCl will mean Ruthenium trichloride hydrate in the following.

Example 10310-26-2

The balance of 10310-26-1 was freeze dried as described on page 2.

Example 10310-38 Poorly Mixed Designated as the "No Mix"

Soln. 1: 13.3 gms of RuCl in 150 mls D. water. Soln. 2: 59.57 gms of SOAL-235 diluted to 150 mls. The 2 solutions were mixed by simple simultaneous pouring into a beaker and given a few minutes of slow stirring with a magnetic stirring bar contained in the beaker while the pH was adjusted from the initial 12.1 to pH 7 with 10% nitric acid.
•Recovery, washing and drying were as described for ex. "A" above.

Example 10310-41 Hot Aging

Soln. 1 and 2: same as "C" above. The solutions were jet mixed at room temperature, pH adjusted to 7 as usual then heated for 48 hrs at 75-80 deg.C with magnetic stirring. The sample was then washed by centrifuging and oven dried.

Example 10310-41-1

This is a small portion of 10310-41 which was not aged at 75-80 deg.C. It was simply dried after precipitation and washing.

Example 10310-49-2 Homogeneous Precipitation w/Al (O-sBu)$_3$

A solution consisting of 9.97 gm of RuCl in 150 ml of acetone and 15 ml of water was added to a solution of 51.2 gms of Aluminum tri sec-butoxide in 100 ml of sec-butyl alcohol while being vigorously stirred. A thick black precipitate formed. Generally it is believed that this type of process yields a very intimate mixture of the hydrous metal oxides as the hydrolysis of the aluminum alkoxide produces a basic response to precipitate the other metals present as chloride, etc.

The precipitate was thinned with an additional 100 ml of dist. water (pH was not adjusted as it was measured at near 7). About ½ of the liquid was removed by blowing air through the beaker contents for 5 days while stirring. This was to remove most of the organics present. The precipitate was then filtered and washed 3 times before drying. This catalyst was of very low activity evidenced by the low approach to equilibrium.

Example 10310-16-2 Homo Precip. w/Metal Nitrates

A solution consisting of 9.97 gm of RuCl, 72.63 gm of Aluminum nitrate 9-hydrate, 41.7 of urea, and 300 ml of water was heated at 80-90 deg.C for 16 hrs. During this time the urea hydrolyses to form hydroxide and/or carbonate ion which precipitates, like the prep. "F" above, an intimate mixture of the metal hydrous oxides. Because of the stoichiometry of the starting solution, no pH adjustment was necessary.

The precipitate was recovered, washed, and dried in an air oven as usual. It was of very low activity.

Example 10310-54 30% RuO/10% $Dy_2O_3$/60% $Al_2O_3$

Soln. 1: 9.97 gm of RuCl and 1.76 gms of Dysprosium nitrate 5 hydrate were dissolved in 150 mls dist. water. Soln. 2: 38.3 gm of SOAL-235 solution was diluted to 150 mls. The two solutions were mixed in a jet mixer nozzle, pH adjusted to 7, recovered, washed and dried in an air oven as described on page 1. This was an attempt to find a synergism between the paramagnetic dysprosium and the active ruthenium in the catalyst.

TABLE 6

Preparation Variations and Repeats 30 Percent RuO/Al2O3 Catalyst
All Precipitated, No Formaldehyde Pre-Reduction

| Catalyst Number | Catalyst Type | Activation Conditions | Surface Area | Beta | % Approach to Equilibrium |
|---|---|---|---|---|---|
| 10310-39 | From Ru Nitrate | 6 Hr./300 × C/H2 | 344 | 25.3 | 78.3 |
|  | Room Temp | " |  | 14.08 | 88.0 |
|  | Solutions | " |  | 9.98 | 87.0 |
|  | pH 7 Adj. | " |  | 6.2 | 75 |
|  | Oven Dry | " |  | 4.2 | 70 |
| 10310-42 | From Ru Nitrate | 6 Hr./300 × C/H2 | — | 7.5 | 60 |
|  | Room Temp | " |  | 25.8 | 88.1 |
|  | Solutions | " |  | 14.33 | 93.1 |
|  | pH 7 Adj. | " |  | 9.96 | 93.7 |
|  | Oven Dry | " |  | 7 | 85 |
|  |  | " |  | 4.75 | 75 |
|  |  | " |  | 3.5 | 70 |
|  |  | " |  | 1.8 | 59.99 |
| 10310-55 | From Ru Nitrate | 6 Hr./300 × C/H2 | — | 24.6 | 87.5 |
|  | Cold Prep | " |  | 12.9 | 91.9 |
|  | pH 7 Adj. | " |  | 9.85 | 91.9 |
|  | Oven Dry | " |  | 7.35 | 84.3 |
|  |  | " |  | 4.82 | 75 |
|  |  | " |  | 3.77 | 70.8 |
|  |  | " |  | 1.88 | 61.1 |
| 10310-40-1 | From Ru Chloride | 6 Hr./300 × C/H2 | 386 | 21.5 | 73.7 |
|  | Cold Solutions | " |  | 11.9 | 78.5 |
|  | pH 7 Adj. | " |  | 8.5 | 76.2 |
|  | Oven Dry | " |  | 7.7 | 75 |
|  |  | " |  | 6.3 | 70 |
|  |  | " |  | 3.6 | 59.8 |
| 10310-40-2 | From Ru Chloride | 6 Hr./300 × C/H2 | 377 | 20.6 | 77 |
|  | Cold Solutions | " |  | 11.6 | 83.9 |
|  | pH 7 Adj. | " |  | 8.2 | 78.8 |
|  | Oven Dry | " |  | 6.3 | 75.2 |
|  |  | " |  | 4.97 | 70.1 |
|  |  | " |  | 2.5 | 59.1 |
| 10310-40-3 | From Ru Chloride | 6 Hr./300 × C/H2 | 363 | 21.74 | 77.8 |
|  | Cold Solutions | " |  | 12.01 | 82.1 |
|  | pH 7 Adj. | " |  | 8.51 | 79.5 |
|  | Oven Dry | " |  | 6.8 | 75.0 |
|  |  | " |  | 5.15 | 67.3 |
|  |  | " |  | 2.4 | 58.9 |
| 10310-26-1 | From Ru Chloride | 6 Hr./300 × C/H2 | 321 | 3.8 | 68.8 |
|  | Hot Solutions | " |  | 20.7 | 82.1 |
|  | pH 7 Adj. | " |  | 11.6 | 82.9 |
|  | Oven Dry | " |  | 8.05 | 80.1 |
|  |  | " |  | 5.5 | 74.9 |
|  |  | " |  | 4 | 70.5 |
|  |  | " |  | 2.1 | 60.35 |
| 10310-26-2 | Freeze Dried Portion of 10310-26-1 | 6 Hr./300 × C/H2 | 410 | 14.9 | 53.6 |
|  |  | " |  | 8.65 | 71.97 |
|  |  | " |  | 4.83 | 76.8 |
|  |  | " |  | 3.29 | 73.2 |
|  |  | " |  | 3.0 | 70.6 |
| 10310-38 | Poorly Mixed repeat of 10310-40-1 designated as 'no mix' | 6 Hr./300 × C/H2 | 270 | 19.4 | 73.6 |
|  |  | " |  | 10.8 | 80.5 |
|  |  | " |  | 7.7 | 78.5 |
|  |  | " |  | 4.5 | 70.9 |
| 10310-41 | Repeat of 10310.40-1 with 14 hrs of Ageing at 75-80 × C | 6 Hr./300 × C/H2 | 310 | 20.9 | 74.2 |
|  |  | " |  | 11.9 | 82.8 |
|  |  | " |  | 8.11 | 81.2 |
|  |  | " |  | 6.53 | 75 |
|  |  | " |  | 4.89 | 69.8 |
| 10310-41-1 | Not Aged Portion of 10310-41 | 6 Hr./300 × C/H2 | 377 | 20.6 | 78.9 |
|  |  | " |  | 13.05 | 82.3 |
|  |  | " |  | 9.45 | 81.32 |
|  |  | " |  | 6.38 | 75.89 |
|  |  | " |  | 3.55 | 67.23 |
| 10310-49-2 | Homogeneous Precipitaton | 6 Hr./300 × C/H2 | — | 20 | 58.5 Essen- |
|  |  | " |  | 10.3 | 53.7 tially |

TABLE 6-continued

Preparation Variations and Repeats 30 Percent RuO/Al2O3 Catalyst
All Precipitated, No Formaldehyde Pre-Reduction

| Catalyst Number | Catalyst Type | Activation Conditions | Surface Area | Beta | % Approach to Equilibrium | |
|---|---|---|---|---|---|---|
| | Using Al-Tri-sec-butoxide | " " | | 8.8 | 53.6 | Not Active |
| 10310-16-2 | Homogeneous Precipitation Using Urea & Metal Nitrate Solutions | 6 Hr./300 × C/H2 " | — | 19.8 8.7 | 59.3 54.6 | Very low Activity |
| 10310-54 | 30% RuO 10% Dy2O3 60% Al2O3 | 6 Hr./300 × C/H2 " " | — | 21.6 12.1 8.5 | 74.8 74.5 62.8 | |

Silicates have high activity when activated in flowing hydrogen 150-300 cc/min for 0.25 to 1.0 cc of catalyst at 500-600 deg.C for 3-6 hrs. Activation in hydrogen at lower temperatures or with helium is not effective.

Aluminates, as per the various examples and as illustrated in the figures, activate under many varieties of conditions of time and temperatures. Activation with helium is not effective. "In-Situ" activation means the catalyst is activated by hydrogen and heat while contained in a reactor tube which is attached to the test system. Otherwise the catalyst is activated in the tube external to the test system. There is no significant difference but "in-situ" absolutely prevents accidental air exposure after activation which could occur otherwise.

Only those conditions which are shown in the figures and tables were used. Others may and should work, e.g. lower temperatures than 200-300 deg.C and longer time or higher pressure.

Activation of the above synthesized catalysts is described below. The dried catalyst is ground to a 40-60, 60-80, or a 40-80 mesh size fraction for actual testing. A portion of one of these mesh sizes is loaded into a ¼" or 3/16" diameter stainless steel tube 6" long equipped with Swagelok® fittings. The catalyst sample is held stationary in the center of the tube with quartz wool plugs and sometimes some 30-40 mesh tabular alumina. The wool, the tube, and the tab alumina were found to be catalytically inactive before they were selected for this task.

For in-situ activation, the tube is secured in place in the test system, purged first with helium then with hydrogen and heated with an electrical heater that can be placed around the tube containing the catalyst at a rate of about 25-50 deg.C/15 min to the desired activation temperature for the desired amount of time, usually 300 deg.C/5-6 hrs for the ruthenium-aluminate catalysts. Testing can begin after the catalyst activation is complete and the heating device is removed without any transfer of the tube. Otherwise the catalyst is subjected to the same kind of process in a tube furnace. When cooled to room temperature after activation, the catalyst is purged with helium and the tube carefully capped for storage until needed for testing. Prior to testing, the tube is carefully uncapped and attached to the test system while being purged with helium. When the tube is secure on the test system, it is purged with hydrogen and ready for activity evaluation.

The test system is designed to conduct purified and dried (by 3 A molecular sieves at 77° K) normal cylinder hydrogen to the catalyst. The catalyst and the hydrogen feed is kept at 77° K by a liquid nitrogen bath.

A series of activity determinations at different flow rates of hydrogen is conducted on each catalyst sample. The percent para entering and exiting the reactor is measured by thermal conductivity gas chromatography at 40° C. From the inlet and outlet percent para content, an approach to equilibrium at each flow rate can be calculated knowing that the equilibrium percent para concentration at 77K is about 50%. Since the experiments start with normal hydrogen at about 25% para equilibrium, the test reaction is in the ortho to para direction. Since it is an equilibrium process, the direction (i.e., ortho to para or the reverse) is not important for activity assessment.

As stated previously above, beta is defined as the pounds of catalyst required to convert 1 pound of hydrogen per second. Very active catalysts will convert lots of hydrogen per second. Conversely very little of a very active catalyst will be needed to convert a pound of hydrogen per second. Beta is thus essentially the inverse of activity expressed in the "normal" parlance of catalysis, i.e., lbs of H2 converted per pound of catalyst per minute. Thus high activity is associated with a low beta. Beta is also associated with the flow rate of hydrogen used in the activity test. A low beta is associated with a high flow rate. In the testing of the present invention, the flow rate of hydrogen was changed. Thus the experiments change beta and measure an approach to equilibrium which is directed by the intrinsic ability of the catalyst sample to cause the ortho to para conversion during the test. When mentioned in the text, unless otherwise stated, beta is being expressed at 70% approach to equilibrium.

Activity tests then create a table of flow rates (and equivalent betas) with corresponding % approaches to equilibrium conversion. These are plotted as per the convention established in the mid-1960s programs with beta on the x axis increasing from 0 and % Approach to Equil. on the y axis increasing from 0.

The interpretation is easy. When comparing the curves from 2 or more catalyst activity tests plotted in the way described above, the most active catalyst is the one with the largest % approach to equilibrium at a given beta. Alternately, at a given approach to equilibrium, the catalyst with the lowest beta is the most active.

With the above explanation in mind, the figures showing graphical performance results of the catalysts of the present invention can be analyzed to show the superior performance of the present invention. For instance, in FIG. 1 three different modifications of the synthesis method were compared for effect on catalyst activity. One preparation solution was prepared hot, i.e. 80 deg.C; another was performed without significant mixing or stirring; and a third was aged in a hot condition. The curves in the 4 to 6 beta range are essentially similar in percent approach to equilibrium.

Figure 2:
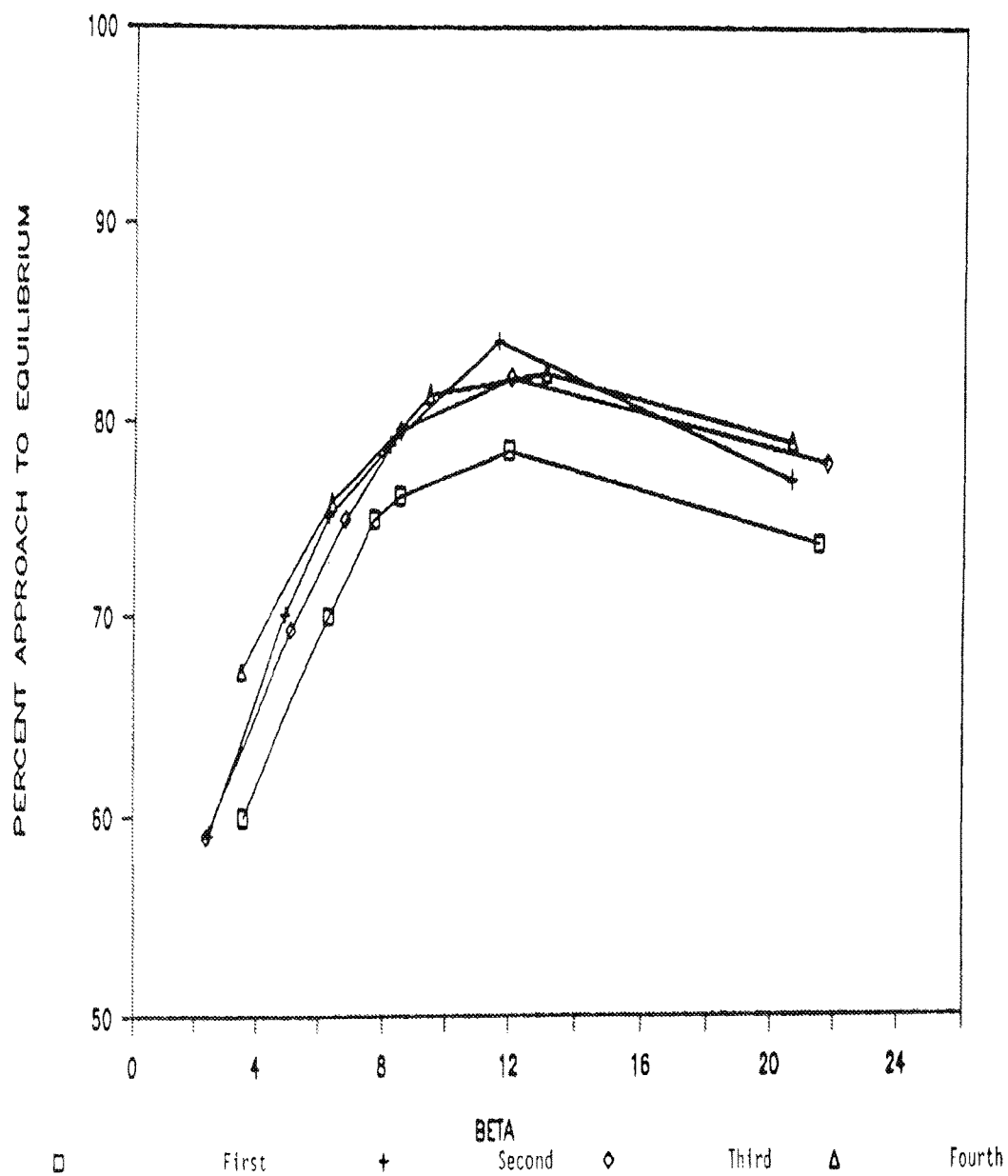
FIG. 2 is a graph showing the reproducibility of low beta, high activity catalysts of the present invention using ruthenium aluminate as the ruthenium catalyst.

FIG. 2 graphs four different examples of the same catalyst synthesis method with the result illustrated that activity is highly reproducible.

Figure 3:
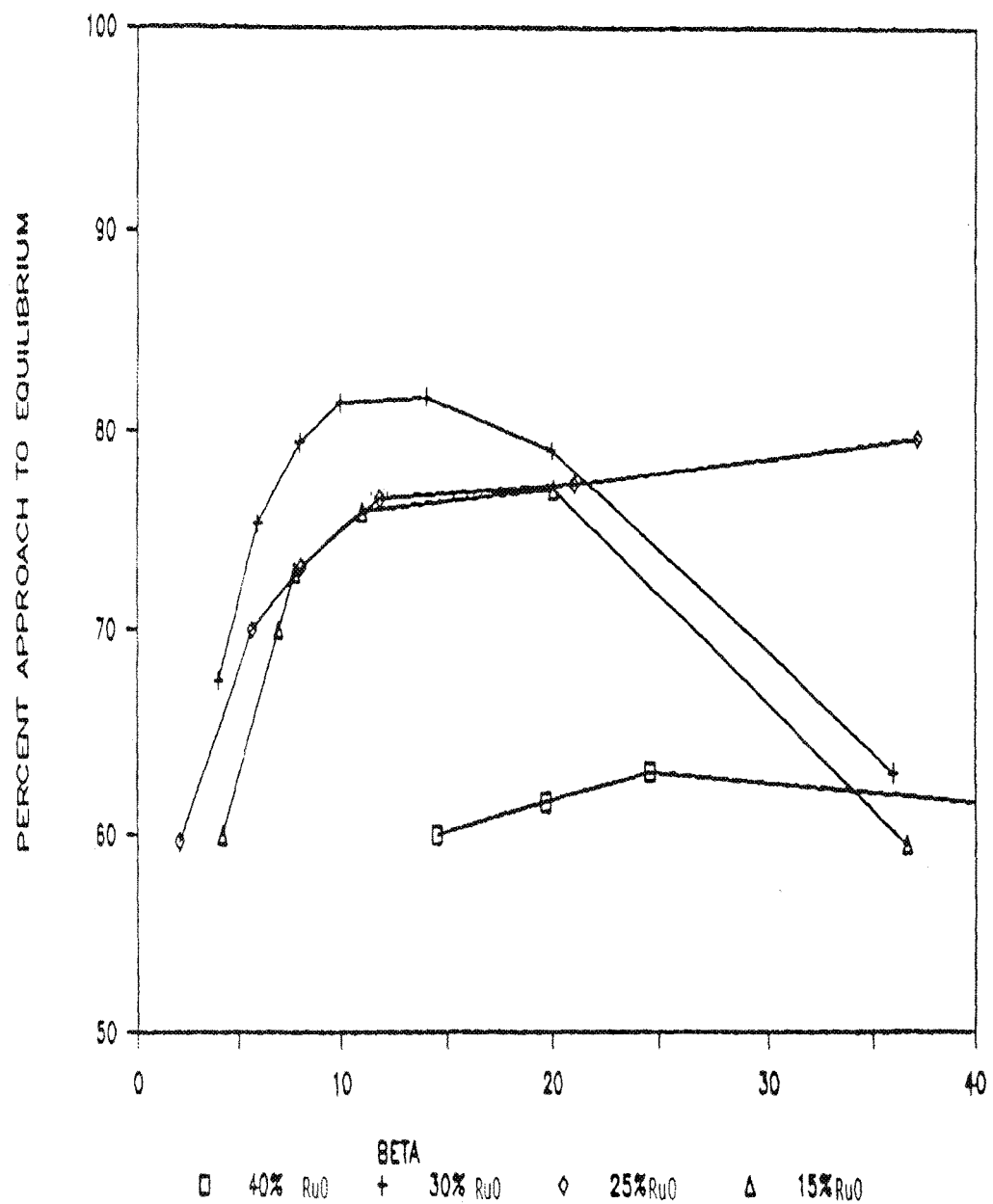
FIG. 3 is a graph showing the optimization of ruthenium content of the catalyst of the present invention to be approximately 30% ruthenium oxide, 70% anion.
Figure 4:
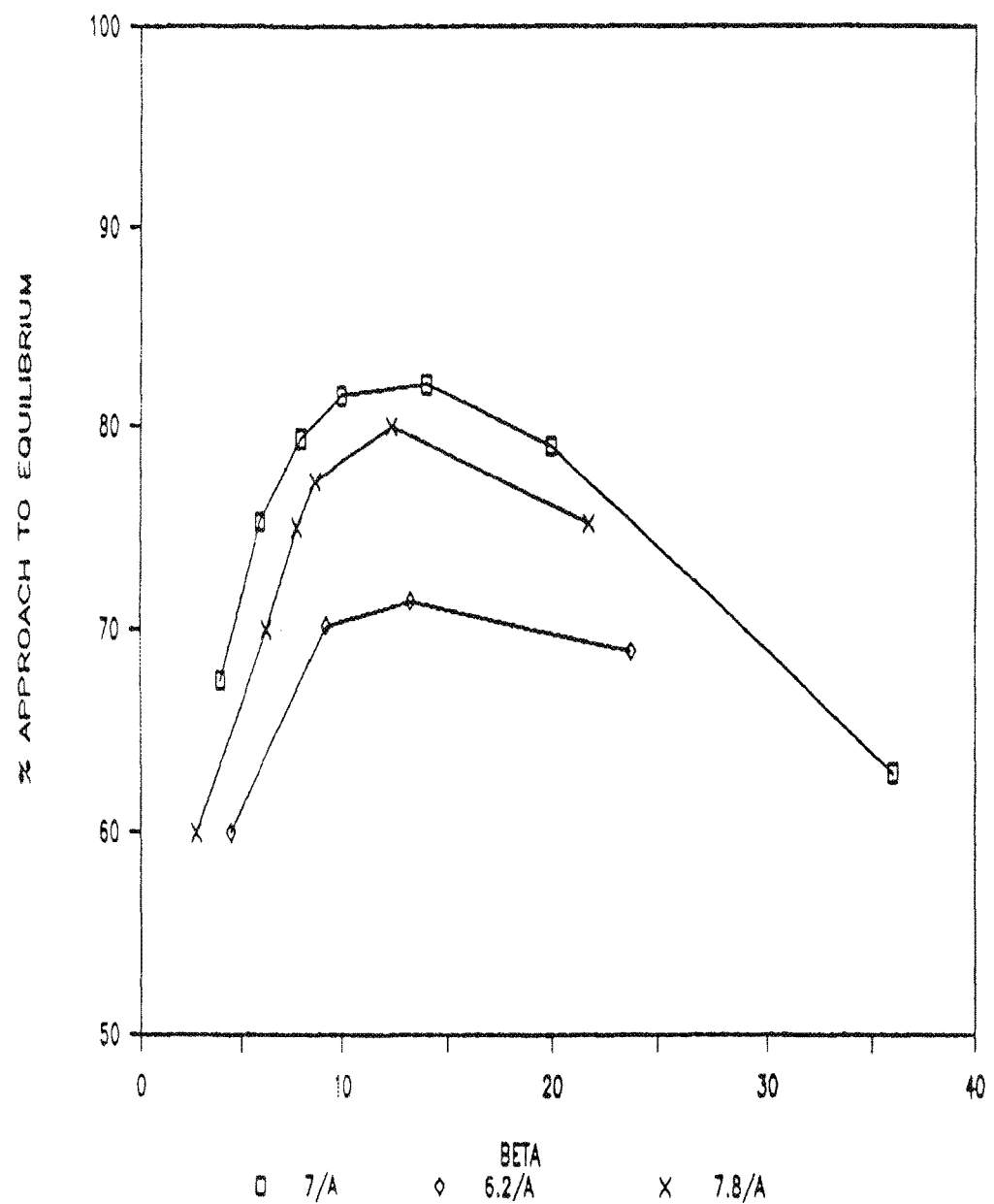
FIG. 4 is a graph showing the advantage of pH adjustment close to a pH of 7 on the activity of the catalyst of the present invention.

FIG. 3 demonstrates in graphical form that the optimum ruthenium catalyst of the present invention has a metal content of approximately 30% based upon ruthenium oxide.

Figure 5:
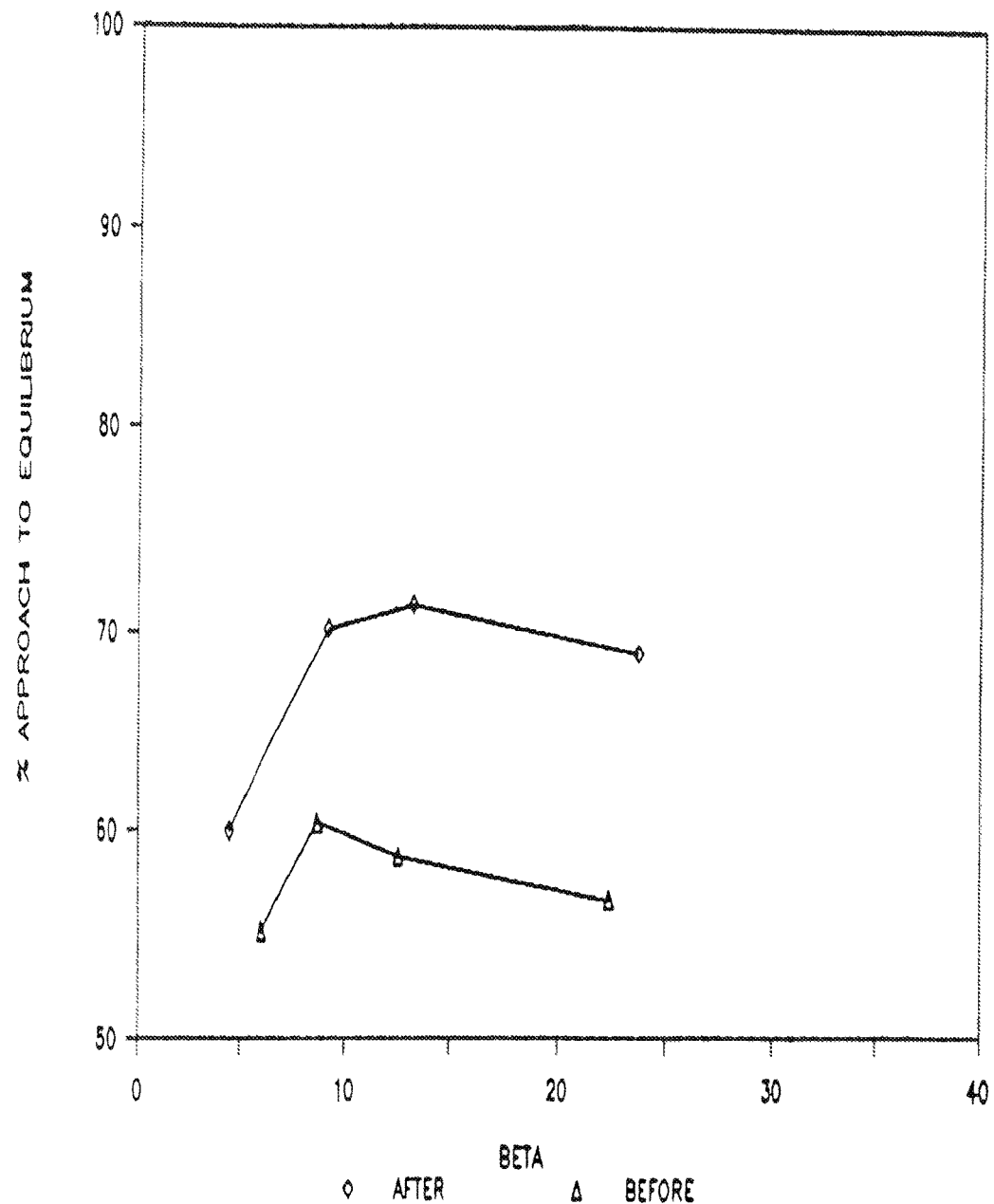
FIG. 5 is a graph showing that pH adjustment after precipitation of the catalyst from solution shows a beneficial enhancement over pH adjustment before precipitation.
Figure 6:
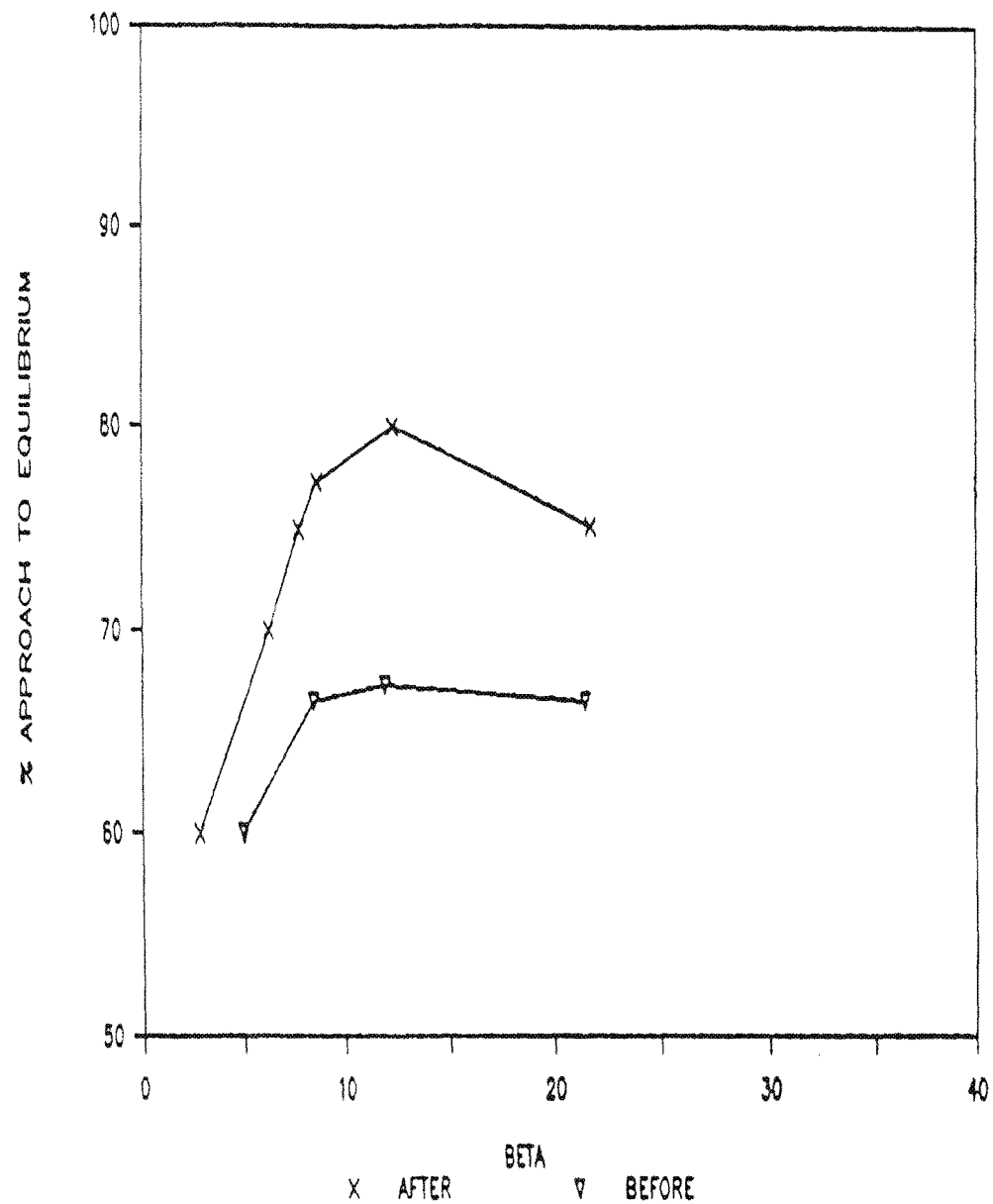
FIG. 6 is a similar graph of beta versus percent approach to equilibrium demonstrating that for a pH adjusted to 7.8, pH adjustment after precipitation is more beneficial than pH adjustment before precipitation.
Figure 7:
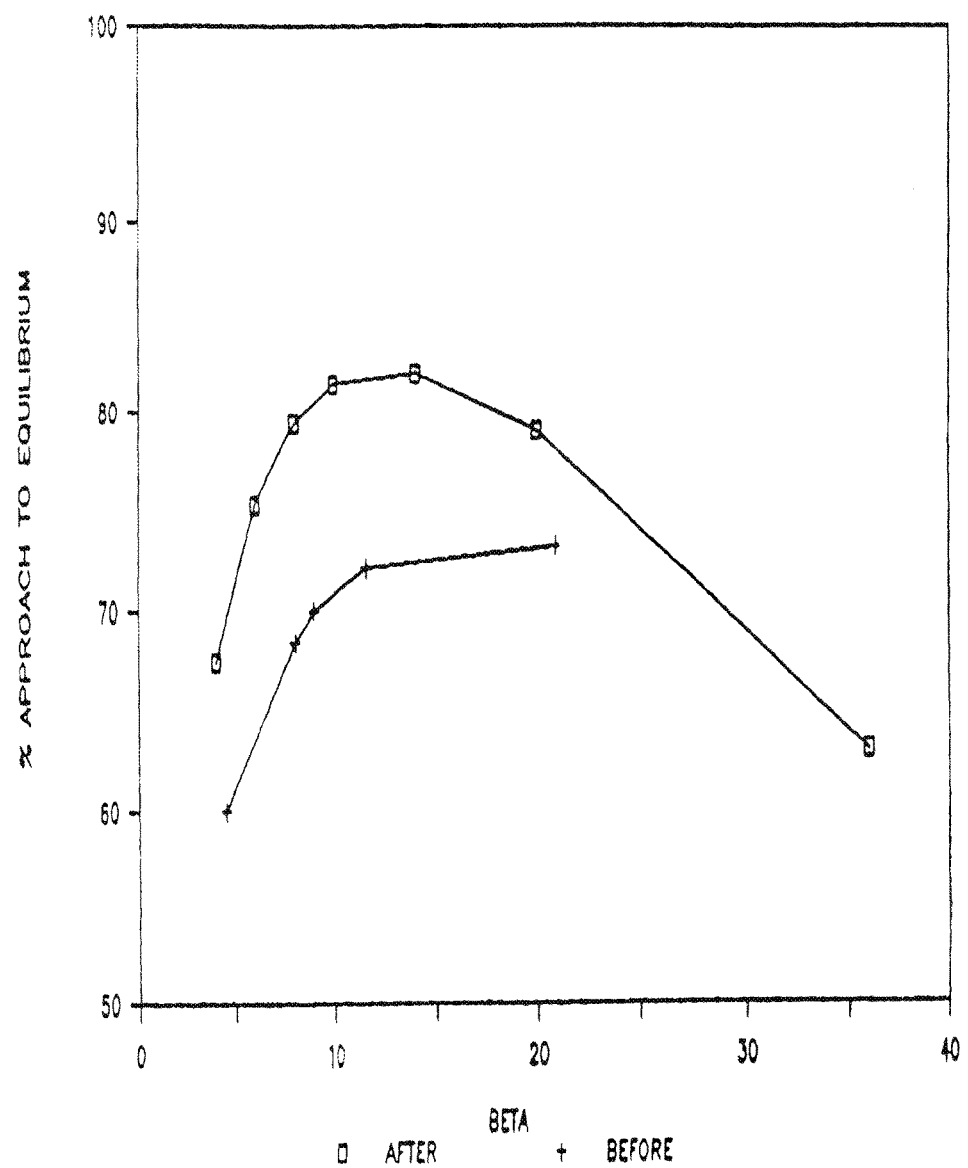
FIG. 7 is a graph of beta versus percent approach to equilibrium showing that pH adjustment to 7 after precipitation of the catalyst from solution is more advantageous than pH adjustment before precipitation.

FIGS. 4-7 demonstrate, in graphical depiction, the effect of pH adjustment on the synthesis method of the present invention. FIG. 5 shows adjustment to a pH of 6.2 before and after precipitation of the catalyst. FIG. 6 shows the same adjustment, but to a pH of 7.8 and FIG. 7 shows the same adjustment, but at a pH of 7. In each instance pH adjustment after precipitation resulted in a higher activity catalyst. When the post-precipitation pH adjustments are compared in FIG. 4, it is apparent that a pH of 7 is preferred.

The main distinguishing feature of this invention is its method of preparation. The method of preparation is what results in the high activity of the catalyst. As noted above, the catalyst is prepared by a precipitation technique in which ruthenium is precipitated from solution with a poorly coordinating anion such as aluminate ($AlO_2^{-1}$) or a silicate ($SiO_3^{-2}$). For the preferred aluminate case, the initially precipitated slurry is adjusted to a pH between about 6.2 and 7.8, preferably 7±0.2, before being filtered, washed and dried.

It is believed that the ruthenium is present in a highly dispersed form, perhaps as a discrete ruthenium compound such as ruthenium aluminate or metasilicate. ESCA data supports high dispersion, although no detection of the presence of discrete compounds which can be identified as ruthenium aluminate or silicate has occurred.

Obviously, ruthenium alumina or silica catalyst can be prepared in many different ways in addition to precipitation. The present inventors have prepared ruthenium catalysts for example by ion exchange on alumina, by impregnation on silica carbon, silica alumina, LZY-72 zeolite and on three kinds of para-ortho catalysts and by hydrolysis and homogeneous precipitations. None of these catalysts were as active as precipitated ruthenium alumina or ruthenium silica catalysts prepared by the precipitation and pH adjustment technique of the present invention.

These alternative techniques to the present invention ordinarily do not result in the very high ruthenium dispersions which can potentially result from precipitation of ruthenium as a discrete ruthenium aluminate or silicate. These alternative techniques to the present invention do not result in ruthenium being present in a poorly coordinating environment. These alternative techniques commonly place ruthenium on the surface of a support in a state of poor dispersion, especially when ruthenium is present in high concentrations.

An important aspect of the method of the present invention over that of the prior art is that when ruthenium alumina catalyst made by mixing ruthenium and aluminate solutions is combined with pH adjustment after precipitation, this results in high activity low beta values. However, when the pH is adjusted before precipitation, for example by adding acid to the ruthenium solution before mixing with the aluminate such that the precipitate slurry pH is between 6.2 and 7.8, a less active catalyst is produced. The difference between these is that the post-precipitation pH adjustment can allow for reaction between ruthenium ion and aluminate (or silicate) ion in formation of the ruthenium aluminate compound. However, the pre-precipitation pH adjustment may prevent formation of much or most ruthenium aluminate by causing precipitation of aluminum as hydrous aluminum oxide before aluminate may react with ruthenium. Ruthenium alumina or ruthenium silica prepared by hydrolysis of a mixture of ruthenium salts and aluminum isopropoxide or tetraethoxysilane also results in catalysts of low activity even though the composition was the same as those made by precipitation using aluminate or silicate ion in solution. Hydrolysis of the aluminum isopropoxide or tetraethoxysilane produces the hydrated porous alumina or silica directly and does not allow formation of a discrete ruthenium aluminate or silicate compound.

Accordingly, it is believed that the unique synthesis process of the present invention affords a new and high activity ruthenium catalyst which has not been practiced or produced before. The low beta values and the ease of reproducibility of the catalyst using the synthesis method of the present invention affords an improvement over any of the reported prior art.

The present invention has been set forth with regard to various embodiments, however the full scope of the invention should be ascertained from the claims which follow.

The invention claimed is:

1. A method of preparing a catalyst of improved activity, comprising the steps of
   (a) mixing a solution of ruthenium cation with a solution of an anion comprising a ligand of poor coordinating power;
   (b) precipitating a catalyst from solution comprising a ruthenium salt of the ligand;
   (c) adjusting the pH of the precipitated catalyst-containing solution to a pH in the range of 6.2 to 7.8; and
   (d) recovering a precipitated ruthenium catalyst.

2. The method of claim 1 wherein the ligand is selected from the group consisting of aluminate, silicate, borate, molybdate and hexafluorophosphate.

3. The method of claim 1 wherein the ligand is aluminate.

4. The method of claim 1 wherein the pH is adjusted in the range of 6.8 to 7.2.

5. The method of claim 1 wherein the recovery includes filtering, washing and drying of the precipitated ruthenium catalyst.

6. A method of preparing a ruthenium aluminate catalyst for conversion and equilibration of para and ortho hydrogen of improved activity, comprising the steps of:
   (a) mixing a solution of ruthenium cation with a solution of aluminate anion;
   (b) precipitating a ruthenium aluminate catalyst from solution;
   (c) adjusting the pH of the solution containing the precipitated catalyst to a pH in the range of 6.8 to 7.2; and
   (d) recovering the ruthenium aluminate by filtering the precipitate from the solution, washing the filtered precipitate and drying the washed precipitate.

7. The method of claim 6 wherein the solution of ruthenium cation comprises aqueous ruthenium chloride.

8. The method of claim 6 wherein the solution of ruthenium cation comprises aqueous ruthenium nitrate.

9. The method of claim 6 wherein the solution of aluminate anion comprises aqueous sodium aluminate.

10. A method of preparing a ruthenium silicate catalyst for conversion and equilibration of para and ortho hydrogen of improved activity, comprising the steps of:
    (a) mixing a solution of ruthenium cation with a solution of silicate anion;
    (b) precipitating a ruthenium silicate catalyst from solution;

(c) adjusting the pH of the solution containing the precipitated catalyst to a pH in the range of 6.8 to 7.2; and
(d) recovering the ruthenium silicate by filtering the precipitate from the solution, washing the filtered precipitate and drying the washed precipitate.

11. The method of claim 10 wherein the solution of ruthenium cation comprises aqueous ruthenium chloride.

12. The method of claim 10 wherein the solution of ruthenium cation comprises aqueous ruthenium nitrate.

13. The method of claim 10 wherein the solution of silicate anion comprises aqueous sodium silicate.

14. A ruthenium catalyst prepared by the process of mixing a solution of a ruthenium cation with a solution of an anion comprising a ligand of poor coordinating power, precipitating a catalyst from solution comprising a ruthenium salt of the ligand, adjusting the pH of the precipitated catalyst containing solution to a pH in the range of 6.2 to 7.8 and recovering the precipitated ruthenium catalyst.

15. The catalyst of claim 14 comprising ruthenium aluminate.

16. The catalyst of claim 14 comprising ruthenium silicate.

17. A method for the conversion of hydrogen feed containing an ortho-para hydrogen distribution which differs from the equilibrium ortho-para hydrogen distribution at any particular temperature to hydrogen having an ortho-para content more closely approaching the equilibrium distribution thereof comprising contacting said hydrogen feed with a catalytic amount of a ruthenium catalyst prepared by a method of mixing a solution of a ruthenium cation with a solution of an anion comprising a ligand of poor coordinating power, precipitating a catalyst from solution comprising a ruthenium salt of the ligand, adjusting the pH of the precipitated catalyst containing solution to a pH in the range of 6.2 to 7.8 and recovering the precipitated ruthenium catalyst.

18. The method of claim 17 wherein the catalyst is ruthenium aluminate.

19. The method of claim 17 wherein the catalyst is ruthenium silicate.

* * * * *